Figure 1:
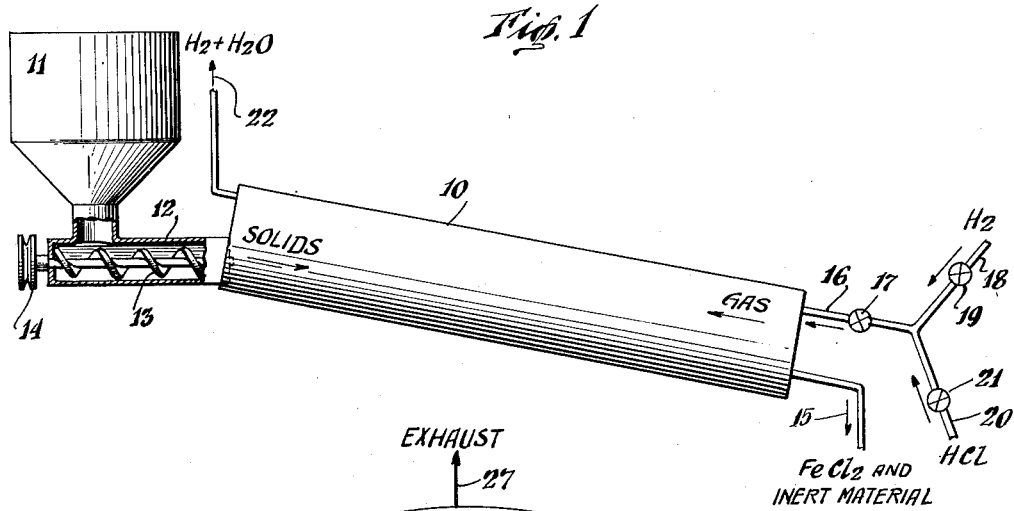

INVENTORS
MARION ERNEST GRAHAM
ASHLAND S. HENDERSON
BY IRVING P. WHITEHOUSE

Robert S. Dunham
ATTORNEY

Patented Jan. 5, 1954

2,665,191

UNITED STATES PATENT OFFICE 2,665,191

PREPARATION OF FERROUS CHLORIDE FROM IRON OXIDE-CONTAINING MATERIAL

Marion Ernest Graham, Parma, Ashland S. Henderson, Berea, and Irving P. Whitehouse, South Euclid, Ohio, assignors, by mesne assignments, to Republic Steel Corporation, Cleveland, Ohio, a corporation of New Jersey Application November 15, 1949, Serial No. 127,428

9 Claims. (Cl. 23—87)

The present invention relates to the preparation in a dry state of ferrous chloride ($FeCl_2$) from an iron oxide-containing material. The invention particularly relates to the treatment of such materials as iron ores, which contain one or more of the oxides of iron, and which may be treated without fusion or solution in a liquid medium, to convert the iron into ferrous chloride. Because of the fact that most iron oxides contain at least some iron in a ferric state, it is necessary that the iron be reduced from a valence of three to a valence of two, incident to, and preferably substantially simultaneously with the conversion thereof to the chloride, so that the chloride formed will be ferrous chloride, rather than some or all ferric chloride.

The process is adaptable to the treatment of any iron oxide-containing materials, with or without other materials such as oxides of other metals as well as with or without more or less gangue. As such it is adaptable to the treatment of ores of the types now used in metallurgical operations in the making of iron, as well as for the treatment of relatively low grade iron ores. Some iron oxide-containing materials, which may be used in accordance with the present process, may not be considered iron ores in the ordinary commercial sense, but still contain sufficient iron oxide or oxides, so that the present process may advantageously be practiced thereon. In general, iron oxide-containing materials, such as flue dust, which is available as a by-product from conventional metallurgical operations on iron may be used as the solid raw material for the present process. Mill scale may also be used. Other materials containing iron oxide, which are not classified as ores, but which may result as by-products from other operations, may also be treated in accordance with the present process and are to be included in the generic term "iron oxide-containing material."

The present invention may be summarized as follows: An iron oxide-containing material is heated up to an initial temperature in the order of about 500° F. up to about 800° F. and then is exposed to a gaseous mixture, the essential active ingredients of which consist of hydrogen and gaseous hydrogen chloride, in a manner such that the solid material is progressively, or in stages, raised in temperature during and throughout the process, so that the final temperature will be in the order of about 800° F. to about 1200° F. The gaseous mixture is preferably but not necessarily, passed in contact with the iron oxide-containing material in a substantially countercurrent manner. This gaseous mixture has a chemical composition, when in contact with the solid iron-containing material, at the highest temperature, such that the hydrogen chloride content is the maximum available for the process and may be as high as about 50%. Usually, however, the hydrogen chloride concentration in the gases will not be over about 15%; and may be as low as about 5% at this point. The hydrogen concentration of these gases at this stage of the process will be sufficient to provide the stoichiometric amount of hydrogen required for the reduction of the trivalent iron to bivalent iron. In some instances the gases may consist only of hydrogen and hydrogen chloride along with more or less water vapor; while in other instances these gases may be mixed with some inert gas, such as nitrogen. In certain instances some other reducing gas may be present, such as carbon monoxide, although this is not essential to the present process.

At the low temperature end of the process, i. e. with the solid materials at the temperature at which the process is to commence thereon, the gases in contact therewith are relatively low in hydrogen chloride. This portion of the process thus serves primarily for the utilization out of the gases of a maximum amount of the remaining hydrogen chloride. It is preferred, for example, that the hydrogen chloride concentration in this stage of the process be reduced substantially to zero for reasons hereinafter set forth.

It is an essential part of this invention that a temperature gradient be maintained throughout the process, such gradient being maintained by either a uniform or non-uniform raising of the temperature of the solid materials as the process proceeds. Either type of temperature increase is contemplated to be included in the term "progressively" as used herein in connection with the desired increasing temperature or temperature gradient, considered from the point of view of the solid material.

By this process it is found feasible commercially to convert a large proportion of the iron initially present into ferrous chloride, yields of 90% to 95% (expressed as iron converted to $FeCl_2$) being common.

A principal general object of the present invention is to provide a process for the conversion to $FeCl_2$ of a maximum amount of the iron, found initially in some oxide form, while minimizing the formation of metallic iron. The $FeCl_2$ formed may thereafter be separated from other materials present initially and which may be used for any purpose for which this material is suitable. A particular advantage of the present process is that it enables the recovery of iron from materials from which iron is otherwise difficult to recover, and includes the conversion of the iron to a form in which it is available and useable from an economic point of view.

While the process may be carried out in a number of different ways, as hereinafter set forth, and in many different types of apparatus, there is shown diagrammatically in the accompanying drawings two different types of apparatus in which the process may be performed.

Figure 2:
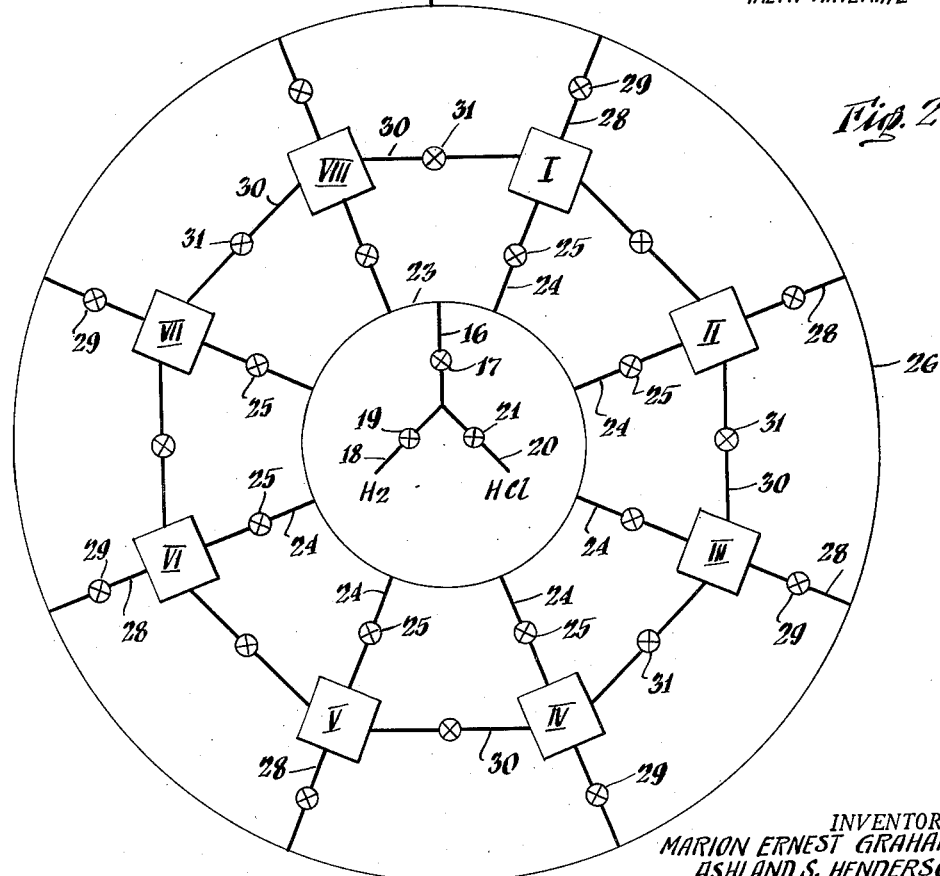

In the drawings:

Figure 1 is a diagrammatic illustration of a continuous rotary kiln type apparatus in which the process may be performed, gas passing therethrough in a direction countercurrent to the flow of solid material; and Fig. 2 is a diagrammatic illustration of a plurality of reaction chambers to which the solid material may be supplied and in which the process may be carried out in a substantially step-by-step manner.

The type of materials to which this process is applicable has been set forth generally hereinabove. Such materials are usually crushed or otherwise comminuted, if they need such action, to insure that they will be in a desired size range. The effect of particle size will be particularly discussed hereinafter. The materials may vary substantially in chemical composition, for example, some ores may be substantially all magnetite, at least as to the iron oxide content thereof, along with gangue. Some may contain iron, all substantially in the form of $Fe_2O_3$ (as hematite); while some may be in the form of limonitic iron oxides. The character of the ore used as an iron oxide-containing material has an effect upon the process and should be taken into account in the particular conditions to be set up for the process, as hereinafter set forth. Mixtures of several different types of iron oxide-containing materials may be used. Some ores which may be treated in accordance with the present process include other metals in addition to iron, for example, a lateritic ore which may also contain other metal values.

Following the initial treatment of the iron oxide-containing material to bring it to a desired size range, as hereinabove set forth, this solid material should preferably be heated, as a preliminary step, to about the temperature at which the reaction may occur, i. e. to the low reaction temperature. This is the temperature for the first stage of the process or the initial portion thereof (considered from the point of view of the solid material), according to the type of apparatus in which it is performed. This preheating may be done in any suitable way, which forms per se no necessary part of the present process. If the process is to be carried out in a rotary kiln, for example, an initial portion of the kiln may be devoted to preheating; or alternatively, heating may be done in a separate apparatus prior to the introduction of the material into the reaction apparatus proper.

The initial stage of the process, from the point of view of the iron oxide-containing material, is at the lower temperature range for the process. This low temperature range is chosen so that the reaction to be accomplished in this portion of the process will proceed at some satisfactory rate. The low temperature range will be different for different ores as hereinafter set forth, but from a broad point of view may be considered to be in the temperature range of about 500° to about 800° F. Below these temperatures, which are different for different ores as aforesaid, the speed of reaction is so slow that no satisfactory conversion of the iron oxide material to $FeCl_2$ can occur. In other words, the reaction even though occurring to some slight extent, is not economical below the temperatures herein selected as the low temperature range.

The low temperature range of the process is one in which the gases supplied to this stage contain a substantial amount of hydrogen, a substantial amount of water vapor resulting from the reduction of iron oxide in other stages of the process (earlier as to the gases, but later as to the solid in a countercurrent flow process), and wherein the hydrogen chloride concentration is relatively low. It is desired, in this stage of the process to absorb the maximum amount of hydrogen chloride present in the gases into the solids by conversion of the iron to ferrous chloride, so that gases leaving this stage of the process will contain a minimum of hydrogen chloride. The absorption of hydrogen chloride from the gases is found to occur best at lower temperatures, so that this stage is utilized primarily for using up any remaining hydrogen chloride in the gases. It is important in a practical operation that this hydrogen chloride be removed from the gases in this stage, as otherwise the remaining hydrogen chloride is likely to be lost. This is due to the fact that the gases, upon leaving this stage of the process, and the process as a whole, are usually cooled to a point such that a major part at least of the water content thereof is condensed. Any hydrogen chloride remaining in the gases during the condensation step for the water will be dissolved in the condensed water; and in the usual case can not economically be recovered therefrom. Thus, in order to effect an economical use of hydrogen chloride, it is necessary to use a maximum proportion of it out of the gases in this step of the process.

Turning now to the last stage of the process from the point of view of the solid material, the temperature is preferably in the maximum range for the particular iron oxide-containing material being treated. From a broad point of view this temperature is in the range of about 800° F. to about 1200° F. depending upon the starting temperature and the character of the solid material being heated. In this highest temperature range, the reduction process occurs with greater facility than at lower temperatures. Also in this high temperature range, in accordance with the present invention, the concentration of hydrogen chloride of the gases is the maximum for the particular process being carried out. This stage, therefore, is used for obtaining the maximum conversion of the iron initially present to the form of ferrous chloride.

As the temperature is increased, there is a greater and greater tendency for the $FeCl_2$ formed by the process, to become sticky. Ferrous chloride melts at about 1240° F. As the temperature approaches 1200° F., the tendency toward stickiness is therefore progressively increased, so that this temperature is about the practical limit at which the operation can be carried on without undue and undesirable sticking together or agglomeration of the solid material. This is important, particularly in a process carried on in a rotary kiln, as shown in Fig.

1, wherein movement of the solid material is necessary to the operation of the process.

Another practical limitation on the upper limit of temperatures at this stage of the process is based on the fact that as the temperature is increased, the percentage of hydrogen chloride in the gas to effect chloridizing must be progressively greater. Thus in a practical installation, where there is a practical limit upon the percentage of hydrogen chloride which may be used or which is available for use, this percentage exerts a limiting influence upon the temperature for the last stage of the process, in that the temperature can not be raised above a point at which the HCl concentration in the gas is adequate to effect chloridizing.

Another function of this so-called last stage of the process is the chloridizing of any iron which may have been reduced to elemental form. This iron, which may possibly be formed to some extent in intermediate stages of the process, may be and is chloridized in this stage of the process, assuming the presence of an adequate proportion of hydrogen chloride in the gases, as hereinafter set forth, and an adequate time for the chloridizing reaction to take place, which is provided by the temperature gradient established for the entire process.

The present process aforesaid lends itself admirably to being carried out on a countercurrent basis, i. e. with the solid material flowing in one direction, while the gases flow in the opposite direction. If the operation is a strictly countercurrent one, such as would take place in apparatus of the rotary kiln type, as diagrammatically illustrated in Fig. 1, the conditions for the operation progressively change from the conditions described hereinabove as the first stage to the conditions described as the last stage. On the other hand, if the operation takes place either on a strictly batch basis or as diagrammatically illustrated in Fig. 2 and hereinafter more particularly described, the operations may be said to take place on a step-by-step basis with the conditions in each step progressively different from both the terminal conditions described above, there being at least one and usually several intermediate stages.

As to the mechanics of the process which are believed to take place, the iron, at least some of which may be initially in the form of ferric oxide ($Fe_2O_3$) or possibly magnetite ($Fe_3O_4$), is reduced to a valence of two so that there is believed to be present as an intermediate more or less evanescent product the lower oxide of iron (FeO). It is believed that this lower oxide of iron is chlorinated by reaction with hydrogen chloride to form $FeCl_2$. In accordance with our present theories of the mechanics of the process, it is desired that the reactions take place in this order, but that the reaction of reducing the iron to FeO not take place too far in advance of the chloridizing of this FeO thus formed. Thus there should be present at all times sufficient hydrogen chloride to chloridize iron about as fast as it is reduced from its initial state to FeO. This action is believed to occur throughout the process and particularly during the intermediate stages of the process, during which adequate hydrogen chloride concentrations are always present. For this reason, the temperature can not be raised too fast in proportion to the conversion of iron to $FeCl_2$, as this might permit the reduction to proceed too rapidly in respect to the chloridizing. Furthermore, the time period during which the solid material is maintained at a given temperature, intermediate the terminal temperatures, can not be too long. For example, if the reduction were permitted to occur greatly in advance of the chloridizing, for example, a period of three hours, the FeO, which is unstable at chloridizing temperatures, and if held at such temperatures for too long a period tends to break down into elemental iron and $Fe_3O_4$. While it is possible to chloridize metallic iron in the last stage of the process if adequate hydrogen chloride is present, this may be accomplished in a reasonable time only with relatively small amounts of iron. It has also been found when iron is in the form of $Fe_3O_4$, the most difficult situation is presented for chloridizing of any of the forms of iron as an oxide. Thus if the amount of iron so reduced to an elemental state is too large, the time required in the last stage of the process for converting it all to chloride, which is possible if sufficient time be afforded, is too long for the practical economic operation of the process. As a result there is a relation between temperature gradient and hydrogen chloride concentration in the gases along with the rate of flow of gases which must be established within reasonable limits for the best operation for any particular ore or other iron oxide-containing material. This relation may best be determined by actual trials. It is not critical as to the operation of the process, but affects the efficiency thereof.

The present process specifically involves an increase in temperature as distinguished from a reaction at a constant temperature. It has been found, for example, that while the desired reaction will occur, to a certain and undesirably small extent, at a constant temperature, an increasing temperature is necessary in order that the efficiency of the process be brought to and maintained at the desired level. For example, if the process were to be attempted using a constant temperature and specifically a low temperature, the amount of iron converted to ferrous chloride would be very small. When a higher temperature is used, still using a constant temperature, the conversion is greater, but still inadequate in accordance with the present invention. When, however, an increasing temperature is used, specifically in accordance with the present invention, and starting with a low temperature, with the temperatures being progressively raised to a high temperature, then the efficiency of the process is satisfactorily high. These principles are illustrated by the following two examples:

*Example 1.*—An ore, which is relatively easily chloridized, was placed in a laboratory apparatus through which was passed a gas consisting of hydrogen, hydrogen chloride and more or less water vapor, the hydrogen chloride concentration being 10% and the water vapor at the outset being quite low. The ore used was first crushed to a grain size of 100 mesh and finer. The temperature was maintained constant at about 1100° F. After a two hour reaction time, the remaining solid material was analyzed and found to contain 39.0% of the original iron in the form of elemental or metallic iron.

*Example 2.*—The same ore was used in the same apparatus and with the same initial gas concentration and composition. The only difference between Example 1 and Example 2 was in the temperature conditions established and maintained. In Example 2 the initial temperature was 800° F., which was increased in stages to about 1100° F. At the end of the reaction time the solid material was analyzed. It was found that only 0.6% of the iron initially present was in the form of metallic or elemental iron.

It is believed that these differences in actual results are due, in a substantial part at least, to the fact that iron was reduced to the form of FeO, which in Example 1 was held at a given temperature for a sufficient period so that it decomposed into metallic iron and $Fe_3O_4$; also this FeO reduced to Fe. The desirable results in Example 2 are believed to be due to the fact that the temperature gradient was maintained such that the rate of reduction of iron to FeO did not greatly exceed the rate of chloridizing of this FeO, so that very little of the iron was reduced to the elemental or metallic state.

It has also been found that a temperature, which progressively increases as to the solid material, is essential as compared with a constant temperature for this material in order to obtain maximum chloridizing. This is illustrated by a run carried on at a uniform temperature of 1000° F., rather than at a progressively increasing temperature in accordance with the present invention. Under these circumstances and using a gas concentration containing about 90% hydrogen and 10% hydrogen chloride, chloridizing proceeded for a time period of about three hours. At the end of this time period the rate of chloridizing, as evidenced by the rate of absorption of hydrogen chloride dropped off very rapidly. The result of this test showed that while chloridizing would proceed to a certain extent, little if any further chloridizing will occur beyond that certain extent, even if much additional time be provided. In this test only about one-third of the iron had been converted to $FeCl_2$; and this fraction could not be increased substantially even in a much longer time. On the other hand, when operating in accordance with the present invention, using the same equipment and using the same initial concentration of gases, but with a progressively increasing temperature gradient, conversion of 90-95% of iron to $FeCl_2$ was easily obtained.

Another influence which must be avoided in the carrying out of the process is too high a percentage of water vapor in the gases. When the water content of the gases reaches too high values, it tends to retard the reduction portion of the reaction, and hence also retards the chloridizing of the iron. This difficulty however, is avoided practically in a substantially countercurrent operation, such as would be present in either of the types of devices diagrammatically illustrated in the accompanying drawings. This is due to the fact that the gases are continuously flowing through the apparatus, so as to carry away the water vapor as it is formed. In this way and from a practical point of view, water vapor concentration is never permitted to reach a point where it will serve as a real deterrent to the rate of reaction.

Considering now the effect of different types of iron oxide-containing material on the process and the conditions which must be established for compensating for these differences in solid material, it is found that ores of the hematite type are easiest to chlorinate. An example of an ore relatively easy to chloridize is a Michigan ore having the following analysis and in which the iron oxides are in the form of $Fe_2O_3$:

|  | Per cent |
|---|---|
| Moisture loss | .27 |
| Ignition loss | 4.13 |
| $SiO_2$ | 41.23 |
| Fe | 32.77 |
| CaO | .45 |
| P | .29 |
| S | nil |
| MgO | .48 |
| $Al_2O_3$ | 2.53 |
| Mn | .08 |

Using a gas having an initial concentration of hydrogen chloride of about 10% and the balance hydrogen, this ore was treated in a plurality of separate stages, each conducted as an individual batch operation and in each the concentration of hydrogen chloride being progressively greater as the process proceeded as to the ore. The temperature was progressively increased from about 800° F. in a first stage to about 1100° F. in the last of eight stages. The hydrogen chloride concentration of the gases going into a last stage (as to the gas, which was the first as to the ore) was about 1%. The total time for the entire process as to any one particle of ore was about two hours. It was found that over 90% of the iron had been converted to $FeCl_2$ at the termination of the operation.

Using more or less similar conditions with other types of limonite ores, yields of up to 95% of iron converted to $FeCl_2$ have been obtained at temperatures between 900° and 1000° F. as the maximum temperature, while initial temperatures for the process have been successful using as low as about 500° to 525° F. In the foregoing experiments the ore material was used in the form of a powder, all of which would pass through a 100 mesh screen, so as to give particle size of 100 mesh and finer.

As generally stated above, ores of the magnetite type, i. e. where a large part or all the iron is in the form of $Fe_3O_4$, are relatively difficult to chloridize. This is illustrated in the following example:

A magnetite ore having the following composition was tested:

| | |
|---|---|
| Fe | 67.25 |
| Mn | .04 |
| P | .012 |
| $SiO_2$ | 5.51 |
| CaO | nil |
| MgO | .22 |

Again this ore was crushed to particle size of 100 mesh and finer, the iron being substantially all in the form of $Fe_3O_4$. It was found that the rate of chloridizing at relatively low temperatures in the order of 600° F. through to 900° F. showed a rate about one-half or less as compared with the rate of chloridizing of the Michigan ore discussed in the example above. In order to get a satisfactory chloridizing rate, it was necessary to start the operation at a temperature between about 800° to 900° F.; then rapidly raise the temperature up to about 1100° to 1150° F. or even more; and then use a terminal or highest temperature at about the maximum possible, as discussed above, namely, about 1200° F. When operating at the highest temperature ranges, i. e. from about 1150° up to 1200° F. it was necessary to use a higher hydrogen chloride concentration, namely, about 15% in order that the chloridization proceed satisfactorily in this temperature range.

In general it has been found that limonitic ores (hydrated hematite, $Fe_2O_3$) may be chloridized in accordance with the present invention using initial temperatures in the order of 600° F. and final temperatures in the order of 900° F. Crystalline hematite ($Fe_2O_3$) may be satisfactorily chloridized according to the present invention using initial temperatures in the order of 800° F. and final temperatures in the order of 1100° F. Magnetite ores ($Fe_3O_4$) require the highest range of temperatures and may be satisfactorily chloridized according to the present invention using initial temperatures in the order of 900° F. and final temperatures in the order of 1200° F.

In order to operate in a medium temperature range either an ore which is found suitable for this range may be chosen, or mixtures of different iron oxide-containing materials permitting average chloridizing in the desired temperature range may be used.

The grain or particle size for the entering solid material is another factor to be considered. In general the finer particles or particles of finer grain size react more rapidly than the larger particles. For example, when the entering material is of a particle size of 100 mesh and finer and under otherwise comparable conditions, a percentage conversion of the iron of about 95% can be obtained. Other conditions being the same, but the particle size being 20 mesh and finer, the percentage conversion is only about 55%. If the fines be removed and only substantially uniform sized particles be used, as using a size range from 20 to 28 mesh only, a conversion of the iron present of only about 31% was obtained.

When larger particles are present either in part or as the total of the material being treated and it is desired to obtain practical high yields, such satisfactory yields may be obtained by using more severe chloridizing conditions, either by using a longer time or by using higher temperatures, and higher initial hydrogen chloride concentrations or both. As a practical matter the time has a much less effect than do the initial hydrogen chloride concentration-temperature factors in increasing the percentage yield as to the relatively coarser sizes of material. From a practical point of view, therefore, there is present an economic balance between the cost of comminuting an original raw material to a desired small particle size as against the increased cost of using a higher temperature and higher hydrogen chloride concentrations.

It is desirable that adequate gas-to-solid contact be maintained during and preferably throughout the process. For this reason some type of agitation may be desirable. One way to obtain the necessary gas-to-solid contact is to employ apparatus of the type of a conventional rotary kiln which gives a continuous agitation of the solid material by tumbling it over and over, as the kiln rotates.

Turning now to the drawings, and particularly Fig. 1 thereof, there is shown as a reaction chamber in the form of a rotary kiln 10, which may be of any suitable size and be rotated by and mounted upon any suitable and/or conventional means (not shown). The solid material, which has been suitably comminuted as may be necessary to insure that it is in a desired size range as aforesaid, may be introduced into a hopper device diagrammatically illustrated at 11.

If desired the solid iron oxide-containing material may be preheated prior to being introduced into a hopper 11 in any suitable manner (not shown). The material may then flow by gravity to a duct 12 and be moved therethrough by a suitable feeding means such as a helical screw 13 driven by a suitable driving wheel 14 from some available source of power, not shown. The solid material, which has been passed through the process, may be conveyed from the kiln 10 in any suitable way and by any suitable equipment indicated diagrammatically by an arrow 15. This material leaving the kiln 10 will contain $FeCl_3$ plus inert material and possibly a small amount of unreacted iron oxide.

Gases may be supplied to the kiln 10 through a suitable means indicated by a line 16 under control of a valve 17, these gases including, for example, hydrogen supplied through a line 18 under control of a valve 19 and hydrogen chloride supplied through a line 20 under control of a valve 21. The exit gases, consisting essentially of hydrogen and water vapor may pass out of the kiln, as indicated by an arrow 22 and be passed to a suitable condenser (not shown) in which the water may be condensed out and the hydrogen suitably used and/or recirculated.

The present invention is not limited to any particular source for the gases, or any specific apparatus, which may be associated with the apparatus necessary for the performance of the present process.

If desired in a rotary kiln type apparatus as shown, the first section of the kiln may be used for preheating a solid material which is supplied to the kiln at substantially room temperature, rather than having a separate preheating stage or apparatus outside the kiln proper.

The total reaction occurring in accordance with the present invention is exothermic in character. Thus there will be heat generated during the process, which may be utilized in part in heating gases or heating solid material entering the process. If necessary, suitable means (not shown) for heat absorption may be used in association with the apparatus of the present invention, so as to obtain a desired temperature gradient. Also, if necessary, heat supplying means may be provided as and where necessary, for supplying any additional amount of heat which may be needed to establish and maintain a desired temperature gradient in the solid material, this gradient being generally rising as the solid material proceeds through the process; although in some instances the material may be maintained at a given temperature for a substantial period of time.

In Fig. 2, another type of apparatus is illustrated diagrammatically in which the process of the present invention may be performed. In this figure there are shown a plurality of reaction chambers, eight being shown in the view; Fig. 2, these chambers being numbered I to VIII respectively. A common supply pipe 23 is provided, to which gases may be supplied through a pipe 16 which may in turn be supplied by lines 18 and 20 and provided with valves 17, 19 and 21 in the same way as described above in connection with Fig. 1 as to the correspondingly numbered parts. The pipe 23 is shown connected with each of the reaction chambers I through VIII by pipes 24, each having a valve 25 therein. Thus gases may be supplied from the pipe 23 selectively to any one of the reaction chambers I to VIII.

An exhaust collection pipe 26 is shown communicating with an exhaust passage 27 corresponding to the passage or pipe indicated by the reference character 22 in Fig. 1. The exhaust collection pipe 26 is connected respectively to each of the chambers I to VIII by pipes 28, each under control of a valve 29. In this way gas may be exhausted from any one of the chambers I to VIII respectively to the exhaust collection pipe 26 and thence to the exhaust passage 27 and under the control of the respectively associated valves 29.

Each of the reaction chambers I to VIII is connected to the next chamber in an annular series by interconnecting passages 30, gas flow through each of which is controlled by a respective valve 31.

Thus in the normal operation of the process it is possible to supply a gaseous mixture, including hydrogen and hydrogen chloride to any one of the chambers; then pass the gaseous mixture from this chamber through a plurality of other chambers in sequence; and then exhaust it from the last chamber of a series. One mode of operation of the apparatus, Fig. 2, would be for example, to supply gases to the chamber VIII, thence in sequence through chambers VII through III, and to exhaust the gas from chamber III through the pipes 28, 26 and 27. New solid material could then be in the process of being filled into the chamber II and chamber I could be in the process of being emptied.

After a predetermined period for operation on this basis, the valve 25 in the pipe 24 to chamber VII could be opened, the valve 31 between chambers VII and VIII closed. Chamber VIII which now contains material as to which the process is completed may then be emptied.

In a similar way once chamber II has been filled, the valve 29 in the pipe 28 connecting this chamber to the pipe 26 may be opened, the valve 25 in the pipe 24 from chamber II kept closed, the valve 31 between chambers I and II kept closed, and the valve 31 between chambers II and III opened. Then the valve 29 in the pipe 28 from chamber III may be closed. Under these circumstances the gases will flow through chamber II prior to being exhausted from the process. In a similar way the process may be substantially continuously carried on in stages at the ends of suitable time intervals. During any one time interval as many as six of the chambers may be simultaneously in use in different stages of the process, while one chamber may be in the course of being emptied of solid material and another in the course of being filled.

This operation is in effect a countercurrent operation, but with the material always stationary during the process, the action taking place in progressive stages as to any one batch of material. By providing suitable temperature control means for each of the reaction chambers I to VIII and by providing the necessary gas concentration entering the initial chamber (from the point of view of gas flow), the reaction may be made to proceed as generally described aforesaid.

While we have diagrammatically shown and described but two types of apparatus in which the process may be carried on and have described the effects of different variables in the performance of the process, it is intended that all equivalents which would reasonably suggest themselves to those skilled in the art from the foregoing shall be included within the purview of the present invention.

What is claimed is:

1. The process of preparing ferrous chloride from a solid iron oxide-containing material, which comprises the steps of exposing said material to the action of a gaseous mixture, the essential active ingredients of which consist essentially of hydrogen and hydrogen chloride and containing at least as much hydrogen by volume as hydrogen chloride, during such exposure progressively raising the temperature of the material from a selected initial temperature in the range of about 500° F. to about 800° F. to a selected final temperature in the range of about 800° F. to about 1200° F., and wherein said final temperature is always substantially higher than said initial temperature, and also during such exposure and as the temperature of said solid material is increased, controlling the composition of the gaseous mixture to provide increasing proportions of hydrogen chloride in the gases in contact with said solid material.

2. The process of preparing ferrous chloride from a solid iron oxide containing material, which comprises the steps of treating said material in a first stage of the process with a gaseous mixture, the essential active ingredients of which consist of hydrogen and a relatively small amount of hydrogen chloride, controlling the temperature in said first stage to maintain it in a temperature range of about 750° F. to 800° F., treating said solid material in a last stage of the process, in which a substantial part of the iron entering the last stage has been converted to ferrous chloride, with a gaseous mixture, the essential active ingredients of which consist of hydrogen and a relatively large amount of hydrogen chloride, and containing at least as much hydrogen by volume as hydrogen chloride, maintaining the temperature of said material in said last stage in the range of about 1050° F. to 1150° F.; and treating said material in at least one intermediate stage of the process with a gaseous mixture, the essential active ingredients of which consist of hydrogen and an amount of hydrogen chloride greater than that in said first stage and less than that in said last stage, and maintaining the temperature of said material in said intermediate stage in a selected temperature range intermediate the temperatures in said first and said last stages.

3. The process according to claim 1, wherein said iron oxide-containing material is a hydrated hematite, wherein said initial temperature is about 600° F., and said final temperature is about 900° F.

4. The process according to claim 1, wherein said iron oxide-containing material is a crystalline hematite, wherein said initial temperature is about 800° F., and said final temperature is about 1100° F.

5. The process according to claim 1, wherein said iron oxide-containing material is a magnetite, wherein said initial temperature is about 900° F., and said final temperature is about 1200° F.

6. The process according to claim 1, wherein the volume concentration of hydrogen chloride in the gaseous mixture to which said solid material is exposed when at the highest temperature it attains as aforesaid is about 15%, and wherein said volume concentration of hydrogen chloride in said gaseous mixture to which said solid material is exposed at the lowest temperature at which it is exposed to said gaseous mixture is substantially zero.

7. The process of preparing ferrous chloride from a solid iron-oxide containing material, which comprises the steps of contacting said material in a plurality of process stages with a gas, the essential active ingredients of which consist of hydrogen and hydrogen chloride and containing at least as much hydrogen by volume as hydrogen chloride; maintaining the temperature of said solid material in the first of said stages, at which this material is initially brought into contact with said gas, in the range of about 500° F. to about 800° F., raising the temperature of said solid material from each stage to the succeeding stage until at the highest temperature-last stage of the process as to the solid material, the temperature of said solid material is from about 800° F. to about 1200° F., and wherein the temperature of said material in said last stage is always substantially higher than its temperature in the first of said stages; introducing said gas for its initial contact with said solid material into the last of said stages and thence passing said gas progressively through the intermediate stages to the first of said stages, whereby the solid material in passing through said stages as aforesaid is brought into contact with gas having increasingly higher concentrations of hydrogen chloride, and discharging the remaining gas from the process from the first of said stages.

8. The process of preparing ferrous chloride from a solid iron oxide-containing material, which comprises the steps of passing said material along a predetermined path, passing a gaseous mixture, the essential active ingredients of which consist of hydrogen and hydrogen chloride and containing at least as much hydrogen by volume as hydrogen chloride, along said path in contact with said material and countercurrent to the movement of said material, so that as said material moves along said path it will be in contact with gases containing increasingly higher percentages of hydrogen chloride, progressively raising the temperature of said material as it moves along said path and as it is brought into contact with higher concentrations of hydrogen chloride from an initial temperature in the range of about 500° F. to about 800° F. to a final temperature in the range of about 800° F. to about 1200° F., and wherein said final temperature is always substantially higher than said initial temperature, and controlling the rate of movement of said material along said path so that the gases on leaving their course along said path adjacent to the entrance point of said solid material will have substantially a zero content of hydrogen chloride.

9. The process of preparing a maximum amount of ferrous chloride from a solid iron oxide-containing material, which is in the form of a powder having a particle size of about 100-mesh and finer, which comprises the steps of passing said solid material along a predetermined path, passing a gaseous mixture along said path in contact with said solid material and countercurrent to the movement of said solid material, said gaseous mixture as supplied to said path consisting of at least about 5% hydrogen chloride and the balance hydrogen and water vapor and containing at least as much hydrogen as hydrogen chloride, the water vapor content of the gaseous mixture being sufficiently small so as not substantially to interfere with the conversion of iron oxide to ferrous chloride, so that as said material moves along said path it will be in contact with gases containing increasingly higher percentages of hydrogen chloride, progressively raising the temperature of said material as it moves along said path from an initial temperature in the range of about 500° F. to about 800° F. to a final temperature in the range of about 800° F. to about 1200° F., and wherein said final temperature is always substantially higher than said initial temperature, and controlling the rate of movement of said solid material along said path, so that the gases on leaving their course along said path adjacent to the entrance point of said solid material will have substantially no hydrogen chloride remaining therein.

MARION ERNEST GRAHAM.
ASHLAND S. HENDERSON.
IRVING P. WHITEHOUSE.

References Cited in the file of this patent

UNITED STATES PATENTS

| Number | Name | Date |
|---|---|---|
| 2,184,884 | Muskat et al. | Dec. 26, 1939 |
| 2,245,076 | Muskat et al. | June 10, 1941 |
| 2,368,323 | Pechukas | Jan. 30, 1945 |
| 2,589,466 | Wilcox | Mar. 18, 1952 |

FOREIGN PATENTS

| Number | Country | Date |
|---|---|---|
| 29,325 | Great Britain | 1913 |
| 176,729 | Great Britain | Feb. 28, 1922 |

OTHER REFERENCES

J. W. Mellor's "Inorganic and Theoretical Chem.", pp. 10, 11, vol. 14, 1935 Ed., Longmans, Green & Co., N. Y.

"Handbook of Chemistry and Physics", 27th Ed., page 1703, C. D. Hodgman, Chemical Rubber Publishing Co., Cleveland.